Dec. 6, 1966 J. GEIGER 3,289,654
ROTARY PISTON TYPE INTERNAL COMBUSTION ENGINE
Filed Nov. 19, 1963 2 Sheets-Sheet 1
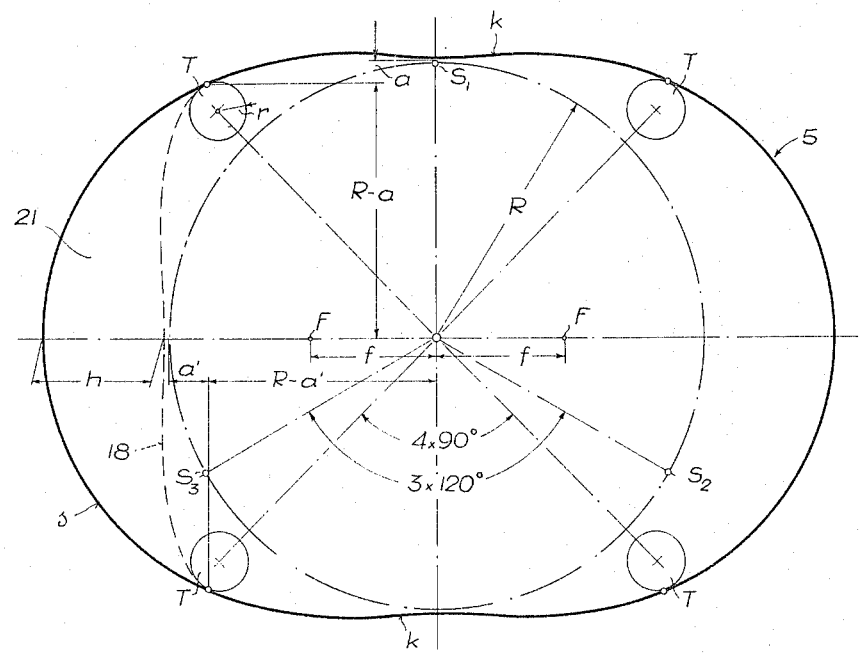
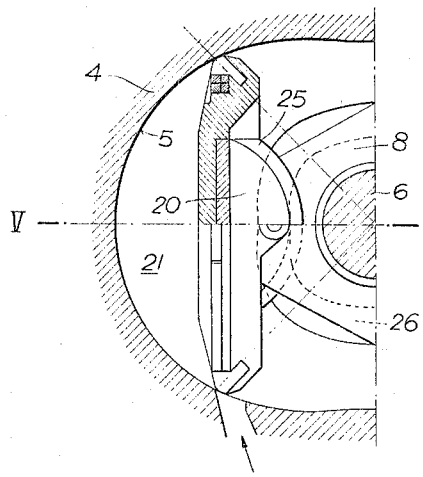 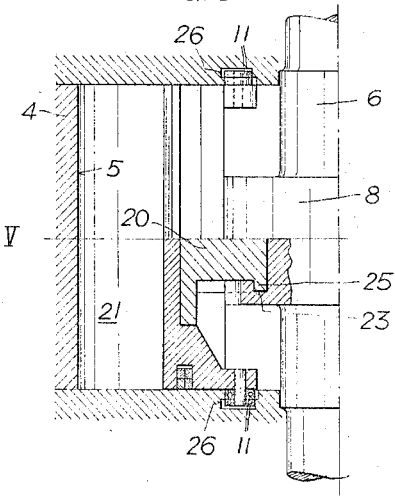
Inventor
Johann Geiger
By
Watson, Cole, Grindle & Watson
Attys.

Dec. 6, 1966         J. GEIGER         3,289,654
ROTARY PISTON TYPE INTERNAL COMBUSTION ENGINE
Filed Nov. 19, 1963         2 Sheets-Sheet 2
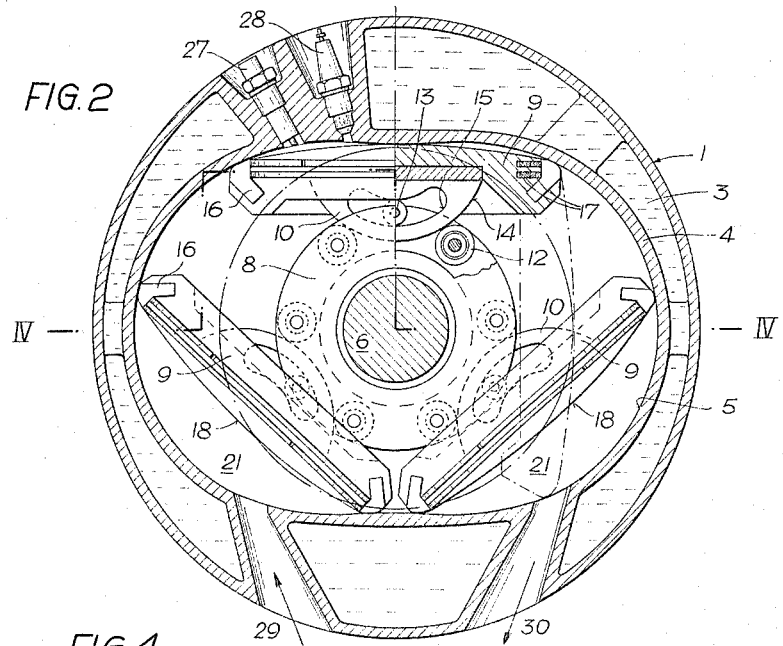
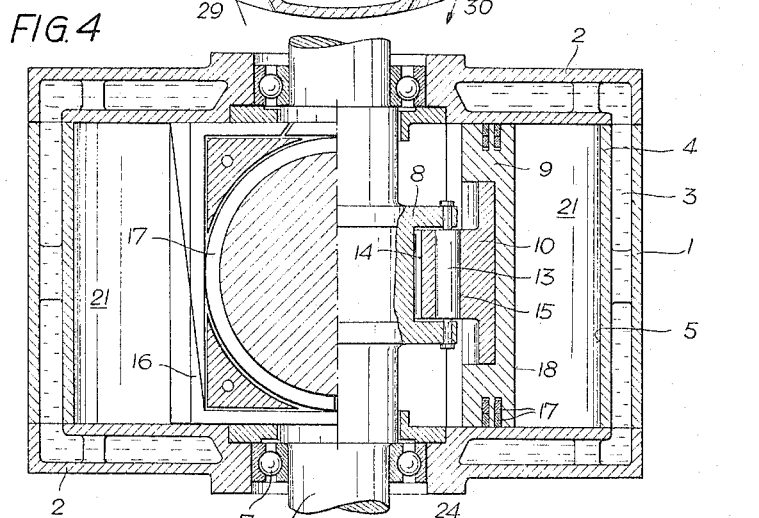
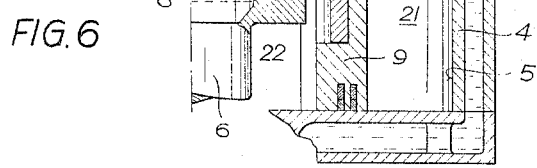
Inventor
Johann Geiger
By
Watson, Cole, Grindle & Watson United States Patent Office 3,289,654
Patented Dec. 6, 1966

3,289,654
ROTARY PISTON TYPE INTERNAL
COMBUSTION ENGINE
Johann Geiger, 262 Triesterstrasse, Vaduz,
Liechtenstein, Austria
Filed Nov. 19, 1963, Ser. No. 324,618
Claims priority, application Austria, Nov. 22, 1962,
A 9,195/62
8 Claims. (Cl. 123—17)

The invention relates to a rotary piston type internal combustion engine, in particular with fuel injection, comprising a stationary housing with a cylindrical race of an oval cross-section composed of two sectors of equal radii opposed to each other in the direction of the larger diameter of the said oval cross-section and interconnected by two curves of a higher order, with a centrally located driven shaft carrying one or several, preferably three, rotatable and oscillatory piston bodies on its hub, each of the centers of rotation and oscillation of said piston bodies being located outside the hub of said shaft and their bearing on the hub being formed by circular bearing surfaces and corresponding counter-guides, each piston body including between its packing strips sliding on the oval housing race working spaces with an aperture angle of over 45° referred to the shaft center and a volume which is variable during rotation, the inlet and outlet apertures of said working spaces in the housing being located on both sides of the area adjoining the axis opposite the area adjoining the axis and comprising the ignition point.

In conjunction with rotary piston type internal combustion engines it is already known in the art to design the piston bodies as slides in the shape of circular piston vanes pivoted in the rotor or in the hub of the shaft, their centers of rotation and/or oscillation being located outside the rotor or the hub of the shaft, as the case may be, and their bearing being constituted by circular guide or counterguide surfaces on the hub or rotor.

The hub of the shaft of these conventional rotary piston internal combustion engines is designed as a rotor closely approaching the areas of the housing race adjoining the axis and defining in conjunction with the piston vane and the housing, the working spaces whose volume is variable during rotation. As particularly with the last mentioned type of circular piston vanes serving as piston bodies the difference between the major and the minor axis of the oval housing cross-section is restricted in view of prevailing geometrical conditions, this design provides for a small stroke volume and consequently, an unsatisfactory output per unit of piston displacement.

The same drawback of inadequate piston displacement also attaches the rotary piston type internal combustion engines of the type referred to above, where the piston bodies are not designed as slides but as segmental pistons oscillating on the hub in an essentially central bearing constituted by gudgeon pins, the bottom sections of said pistons, that is, the surface sections of the piston bodies facing the housing race, defining the work spaces alone with the housing.

The object of the invention is to increase the stroke volume and consequently, the output per unit of piston displacement of rotary piston type internal combustion engines of the type hereabove described. The invention was prompted by the realization that rotary piston type internal combustion engines comprising circular piston vanes supported at the hub by circular guide and counter-guide surfaces offer the most favorable conditions for the practical embodiment of the invention, as this design provides the possibility of locating the centers of rotation and oscillation of the piston bodies on the periphery of the hub of the shaft or even beyond. Such a location of the centers of rotation and/or oscillation of the piston bodies on the outside is liable to provide in conjunction with the use of segmental pistons carried in circular guide and counter-guide surfaces in conformity with the circular shape of the piston vanes, and with the appropriate adaptation of the geometrical conditions affecting the determination of the housing race, a considerable increase of the stroke volume and consequently, of the output per unit of piston displacement and of the effective torque during the expansion stroke as compared with any of the conventional engine types referred to above.

Therefore, the invention is based on the above-mentioned type of rotary piston type internal combustion engines and consists in that the piston bodies are designed in a manner known per se as essentially central segmental pistons with packing strips, whose surface sections facing the housing race define the working spaces alone with the housing and that the radius of the circle on which the oscillation centers of the piston bodies are located during their rotation, is at least approximately equal to or larger than the distances from the center of the shaft defined by the connecting lines extending in parallel relation to each other at the points of transition between the azimuths and the curves of a higher order on the small and/or large axis of the housing cross-section.

According to a preferred embodiment of the invention, the piston body bearings consist of lugs with a circular bearing surface arranged concentrically on the piston bodies, said bearing surface being supported by two rollers mounted on the hub portion with a third roller located between each pair of rollers, said third roller engaging in a circular guide groove of the piston body, the center of curvature of said guide groove coinciding with the circular bearing surface of the piston body. This means of supporting the piston body can be of easy action, particularly if antifriction bearings are used for the rollers, and adjustable if necessary, thereby considerably reducing friction losses and avoiding premature wear of the guide elements.

According to the invention, the piston body bearings may, however, also consist of lugs concentrically arranged on the piston bodies and comprising circular guide bars of a T-shaped or dovetailed cross-section sliding in circular guide grooves of the hub presenting an appropriate counterprofile. This simple design of the pivoting support of the piston bodies affords considerable radial compactness of the engine.

According to a further feature of the invention, positive guidance for the piston bodies can be provided, the guide means comprising two sets of rollers each located concentrically on the sides of the piston body, the individual rollers engaging in guide grooves provided in the front walls of the housing, each set of rollers comprising preferably two coaxial and individually rotatable rollers rolling alternatingly on opposite flanks of the same guide groove. By this positive guidance of the piston bodies temporary contact of the piston body with the housing race can be completely and positively avoided.

Further details of the invention will appear from the following description of several embodiments of the invention with reference to the accompanying drawings in which:

FIG. 1 illustrates the geometrical determination of the contours of the housing race as required for an increased stroke, FIG. 2 is a cross-sectional view of an embodiment of the internal combustion engine according to the invention in perpendicular relation to the engine shaft, FIG. 3 a partial cross-sectional view of another embodiment of the invention comprising a different guide means for the piston body shown in elevation in the lower half of the illustration, FIG. 4 a cross-sectional view of the embodiment shown in FIG. 2 on line IV—IV, FIG. 5 the variant of FIG. 3, the upper half of the illustration representing a plan view and the lower half a cross-sectional view on line V—V of FIG. 3.

FIG. 6 is a partly axial cross-sectional view of another embodiment of the invention.

To determine the housing race 5 (FIG. 1) one starts from a fixed value $f$ depending amongst other factors on the number of piston bodies 9, 19, said value being plotted on the major axis on both sides of the shaft center, its end points F representing the centers for the sectors $s$ of the race 5 defining the working space 21 in the vertices of the major axis. The radius $r$ of these sectors presents a value which is always greater than the fixed value $f$ and may be approximately double to triple the latter.

Supposing the radius of curvature $r'$ for the rounded-off edges of the piston body 9, 19 or for the rounded-off edges of the packing strips 16 in contact with the housing race to be sufficiently large, the corresponding circles of curvature whose centers are located on the diagonals of a square arranged in concentrical relation to the shaft center and having lateral edges extending in perpendicular relation to the axis, touch the above-mentioned azimuths $s$ drawn around the points F on their inside.

During the rotation of the piston bodies 9, 19 the oscillation centers $S_1$, $S_2$, $S_3$ provided approximately in the centers of the piston bodies 9, 19 are located on a circle whose radius R is so dimensioned that the connecting lines of the points of contact T of the above-mentioned circles of curvature with the azimuths $s$ extending in parallel relation to the major and/or minor axis of the oval housing race 5 are offset by a certain amount $a$ and/or $a'$ on the axes towards the center of the shaft.

If the circles of curvature illustrated in the left half of FIG. 1 in superposed relation are associated with a piston body 9, 19 as rollers, one of which can also be designed as a milling cutter if the housing race has been produced by machining and/or machined, the outer contour 18 of said piston body being represented by a dotted line, an envelope curve $k$ of a higher order is produced by the rotation of the piston body 9, 19 with the rollers adjoining the azimuth $s$ around the shaft center, said envelope curve being convex in relation to said center in the areas adjoining the axis, and interconnecting the two azimuths $s$ between the points of contact T arranged side by side of the circles of curvature located on the diagonals of the above-mentioned square.

The contour consisting of the two azimuths $s$ and the envelope curves $k$ interconnecting the same, the vertex of which is offset in relation to the oval cross-section in the area of the minor axis slightly corresponding to a maximum value of approximately 20 percent of the value of the radius R towards the center of the shaft, represents the race 5 for the piston bodies 9, 19 and/or the packing strips 16, the maximum stroke $h$ being illustrated in connection with the position of the piston body 9, 19 shown in the left half of FIG. 1 by dotted lines, the stroke $h$ being considerably greater here as compared with the above-mentioned kind of rotary piston type internal combustion engines and producing as a result of the increased charge also a substantial increase of the output per unit of piston displacement which for the internal combustion engine according to the invention comprising three piston bodies is about equal to the output per piston displacement of disk piston engines of the trochoid type comprising a three-tooth rotor.

The advantageous stroke volume cross-sections provided according to the invention are therefore, obtainable under the geometrical conditions illustrated in FIG. 1 only if the radius R for the circle on which the oscillation centers $S_1$, $S_2$, $S_3$ of the piston bodies 9, 19 are located during their rotation, is either of equal size or larger than the distance R–$a$ and/or R–$a'$ from the shaft center defining the parallel connecting lines of the points of transition T between the azimuths $s$ and the curves $k$ of a higher order on the minor and/or major axis of the cross-section of the housing.

In such cases where segmental pistons are used, however, this requires displacement of the piston body bearings $S_1$, $S_2$, $S_3$ in an outwardly direction, that is, towards the piston head. However, with conventional rotary piston type internal combustion engines comprising segmental pistons oscillating around gudgeon pins this area is no longer adequate for the arrangement of gudgeon pins. The problem of displacing the oscillation centers $S_1$, $S_2$, $S_3$ is solved by different means in the embodiments shown in FIGS. 2 to 6, as will be explained in great detail hereafter. With all embodiments of the invention the rotary piston type internal combustion engine comprises a double-walled cylindrical housing 1, the inner wall 4 of which is of oval shape and serves as a race 5 for the piston bodies 9 and 19 respectively. The interior of the cylindrical housing 1 is closed on both sides by parallel covers 2 which are also double-walled and present coolant spaces 3 inside, as does the cylindrical housing 1.

Symmetrically arranged inlet and outlet apertures 29 and 30, preferably controlled by the segmental pistons, traverse the housing 1 in the area adjoining the minor axis of the housing race 5, whereas on the side opposite these apertures in the housing 1 a fuel-injection nozzle 27 and a spark plug 28 are provided in laterally offset receiving bores. In central bearing bores of the two front walls 2, the rotor shaft 6 rotates in ball bearings 7. In its central area the rotor shaft 6 presents a hub 8 on which the piston bodies 9, 19 are pivoted.

According to the embodiment shown in FIGS. 2 and 4, the piston bodies comprise concentrically arranged lugs 10 provided with circular bearing surfaces 14 on their inside. A continuous circular guide groove 15 is furthermore recessed in the said lugs, the center of curvature of said groove coinciding with the center of curvature of the circular bearing surface 14 of the lug 10. Associated with each piston body 9 are two rollers 12 arranged in spaced relation to each other on the periphery of the hub 8 rotatable in axis parallel relation to the rotor shaft 6, said rollers supporting the lug 10 of the piston body 9 with its circular bearing surface 14. An additional roller 13 is arranged on the hub 8 between each pair of rollers 12 and engages in the circular guide groove 15 of the lug 10 and serves to maintain the piston body 9 in its radial position.

The piston bodies 9 are equipped with split packing strips 16 at their extremities in contact with the housing race 5 as well as on their sides, thus forming working spaces 21 of a periodically variable size, defined outwardly by the housing race 5, on both sides by the inner wall of the covers 2 and inwardly by the slightly vaulted surface portion 18 of the piston body 9.

In the embodiment of the invention shown in FIG. 6, the lug 10 of the piston body 9 is defined on its inside by a circular guide bar 24 presenting a dovetailed cross-section. The guide bar 24 is slidably located in a circular guide groove 22 provided in the hub 8 and presenting a corresponding counterprofile.

A similar swivel support is provided for the embodiment of the invention illustrated in FIG. 5, wherein the lug 20 of the piston body 19 comprises a circular guide bar 25 of a T-shaped cross-section and the hub 8 a guide groove 23 presenting a corresponding counterprofile.

FIGS. 3 and 5 illustrate an additional positive guide means for the piston body 19 which is applicable to any of the foregoing types of piston body bearings. For the purpose, the piston bodies are provided with roller sets separate on both sides, but alined and extending in axis-parallel relation to the rotor shaft 6. Each set of rollers comprises two coaxial and individually rotatable rollers 11 which engage in the guide grooves 26 of the two front walls 2, the rollers 11 of each set resting alternatingly on opposite flanks of the same guide groove 26.

The guide groove 26 can be produced in a simple manner by inserting an end-milling cutter in the bearing of the said roller set. When the piston body 19 performs a complete revolution, the milling cutter describes a curve extending in parallel relation to the housing race 5 which is, however, twisted through 90° in relation to the latter, so that the vertices of the guide curve adjoining the axis coincide with the major axis of the oval inner contour of the housing 1 and ensure an advantageous course of the oscillating motion of the piston bodies.

For the purpose of ensuring the permanent application of a uniform pressure by the piston bodies 9, 19, a circular clamping ring is provided which is located in the plane of the packing strips 16 extending on the front ends around the piston body 9, 19 as shown in the left half of FIG. 4. The packing strips can be rounded off or edged at the points of transition of the working spaces between the front surfaces and the races of the housing so as to adapt same to the particular design of the said transitions (see FIG. 4, left and/or right half).

The rotary piston type internal combustion engine can be equipped with one, two or three piston bodies. In the latter type featuring three piston bodies offset by 120°, care should be used when determining the most advantageous stroke condition to make sure that in the area adjoining the axis and including the gas conduits, the two extremities of the piston body arranged side by side are adequately spaced from another (FIG. 2).

In view of its advantageous stroke condition, the engine according to the invention is not only suitable for use as a power engine but also as a compressor. Besides, other types of oscillatory bearings can be provided within the scope of the invention. For example, the countersupport for the segmental pistons can also be provided by additional positive guidance by means of the aforesaid roller sets engaging in guide grooves of the front walls. Likewise, countersupport for the segmental pistons can be achieved by means of the housing race exclusively.

I claim:

1. A rotary piston-type internal combustion engine, particularly with fuel injection, comprising a stationary housing with an inlet aperture and an outlet aperture and an ignition point opposite said aperture, a cylindrical race of an oval cross-section in said housing, said cross-section consisting of two azimuths of identical radii opposing each other in the direction of the major axis of the cross-section and two curves of a higher order interconnecting the said azimuths, a centrally located driven shaft, a hub on the said driven shaft, swinging supports on the said hub comprising supporting and retaining elements for the support of orientable piston bodies designed as segmental pistons and having a central lug on the side facing the hub, a convex circular-cylindrical guide surface on the said lug adjacent to and guided by the supporting elements of the said swinging support, said lug having a concave circular-cylindrical guide surface thereon adjacent to and guided by the said retaining elements of the swinging support, the concave and the convex circular-cylindrical guide surfaces having the same center of curvature located outside the said hub on a circle the radius of which is larger than the distances from the center of the driven shaft defined by the parallel connecting lines at the points of transition between the azimuths and the curves of a higher order on the minor and major axis respectively, of a cross-section of the housing, and packing strips at the extremities of the piston bodies sliding on the said race of the housing, each piston body defining working spaces in the area between the said packing strips, and the said working spaces presenting a variable volume during rotation and forming aperture angles of over 45 degrees with the center of the shaft.

2. A rotary piston-type internal combustion engine as claimed in claim 1, comprising a central lug on each piston body, circular guide bars of a dovetailed cross-section on said lug, circular guide grooves in the hub in which the said guide bars of the lug of the piston bodies are slidably arranged, the circular guide grooves being provided with a counterprofile mating the dovetailed cross-section of the said guide bars.

3. A rotary piston-type internal combustion engine as claimed in claim 1, with a positive guide means for each piston body, said guide means comprising two sets of rollers centrally arranged on the sides of the piston body, and guide grooves in both front walls of the housing, wherein the individual rollers of the said roller sets engage in the said guide grooves.

4. A rotary piston-type internal combustion engine as claimed in claim 1, comprising a positive guide means for each piston body, said guide means consisting of two sets of rollers centrally arranged on the sides of the piston body, and guide grooves in both front walls of the housing, wherein each of the said roller sets comprises two coaxial and individually rotatable rollers, alternatingly rolling on opposite flanks of the same guide groove.

5. A rotary piston-type internal combustion engine as claimed in claim 1, comprising three piston bodies offset by 120° each in relation to the center of the shaft; their length being such that during their rotation, adjacent piston bodies approach each other closely, leaving a minor clearance only between themselves, a fixed value being provided for the distance between the centers of the said azimuths of the housing race and the shaft center, the radius of the azimuths being 1.7 times, the radius of the said circle on which the said centers of oscillation of the piston bodies are located, 1.5 times the said fixed value and the radius of curvature of the edges of the packing strips in contact with the housing race being 10 percent of the said fixed value, and deviations from these dimensions not exceeding 20 percent, the diagonals extending through the centers of curvature of the two packing strips of a piston body located in parallel relation to the major axis of the cross-section of the housing to the center of the shaft being in perpendicular relation to each other.

6. A rotary piston-type internal combustion engine as claimed in claim 1, comprising split packing strips extending on the front sides around each piston body and a circular clamping ring located in the plane of the said packing strips and pressing the latter against the wall of the housing.

7. A rotary piston-type internal combustion engine as claimed in claim 1, with a central lug on each piston body, a convex circular-cylindrical guide surface on the said lug, the latter being formed by a crescent-shaped guide groove in the said lug and comprising two rollers each pivoted in an axis-parallel arrangement on the swinging supports of the hub, the said convex circular-cylindrical guide surface of the lug of the piston body resting on the said rollers, and a third roller pivoted on the swinging supports of the hub between the first-mentioned rollers and in an axis-parallel relation to same, the said third roller engaging in the crescent-shaped guide groove of the lug of the piston bodies.

8. A rotary piston-type internal combustion engine as claimed in claim 1, comprising a central lug on each piston body, convex and concave circular-cylindrical guide surfaces on the said lug, the said guide surfaces being defined by a crescent-shaped guide bar of a T-shaped cross-section, and also comprising supporting and retaining elements at the swinging supports of the said hub, formed by crescent-shaped guide grooves in the hub, wherein the said guide bar of the lug of the piston body is slidably arranged, and the said guide grooves presenting a counterprofile mating the T-shaped cross-section of the said guide bar.

References Cited by the Examiner
UNITED STATES PATENTS

| | | | |
|---|---|---|---|
| 586,733 | 7/1897 | Shepard. | |
| 3,036,560 | 5/1962 | Geiger | 123—17 |
| 3,108,579 | 10/1963 | Korf | 123—17 |

MARK NEWMAN, *Primary Examiner.*

SAMUEL LEVINE, *Examiner.*

F. T. SADLER, *Assistant Examiner.*